United States Patent
Kuo

(10) Patent No.: US 10,938,772 B2
(45) Date of Patent: Mar. 2, 2021

(54) ACCESS DEVICE FOR ANALYSIS OF PHYSICAL LINKS AND METHOD THEREOF

(71) Applicant: AMBIT MICROSYSTEMS (SHANGHAI) LTD., Shanghai (CN)

(72) Inventor: Shao-Ming Kuo, New Taipei (TW)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 11 days.

(21) Appl. No.: 16/284,037

(22) Filed: Feb. 25, 2019

(65) Prior Publication Data

US 2020/0274847 A1    Aug. 27, 2020

(51) Int. Cl.
- *H04L 12/66* (2006.01)
- *H04L 29/12* (2006.01)
- *H04L 12/741* (2013.01)

(52) U.S. Cl.
CPC .......... *H04L 61/103* (2013.01); *H04L 45/745* (2013.01); *H04L 61/6004* (2013.01)

(58) Field of Classification Search
CPC .... H04L 61/103; H04L 45/745; H04L 61/004
See application file for complete search history.

(56) References Cited

U.S. PATENT DOCUMENTS

| | | | | |
|---|---|---|---|---|
| 6,199,112 B1* | 3/2001 | Wilson | ............... | H04L 29/12028 340/475 |
| 6,785,738 B1* | 8/2004 | Ivaturi | ............... | H04L 29/12009 370/409 |
| 8,995,443 B2* | 3/2015 | Schrum, Jr. | ......... | H04L 61/6077 370/392 |
| 9,276,898 B2 | 3/2016 | Yu et al. | | |
| 2001/0017857 A1* | 8/2001 | Matsukawa | ....... | H04L 29/12018 370/392 |
| 2004/0049586 A1* | 3/2004 | Ocepek | ............. | H04L 29/12018 709/229 |
| 2007/0201490 A1* | 8/2007 | Mahamuni | .............. | H04L 12/56 370/395.54 |
| 2008/0250123 A1* | 10/2008 | Chae | .................. | H04L 29/12028 709/220 |
| 2010/0242084 A1* | 9/2010 | Keeni | ...................... | H04L 63/20 726/1 |
| 2012/0113970 A1* | 5/2012 | Hamachi | ............... | H04L 61/103 370/338 |
| 2013/0322438 A1 | 12/2013 | Gospodarek et al. | | |
| 2016/0036703 A1* | 2/2016 | Josyula | ................... | H04L 45/66 370/392 |
| 2018/0205644 A1* | 7/2018 | Peng | .................... | H04L 61/6022 |
| 2020/0097605 A1* | 3/2020 | Liu | ........................ | G06N 20/00 |

* cited by examiner

*Primary Examiner* — Abdelnabi O Musa
(74) *Attorney, Agent, or Firm* — ScienBiziP, P.C.

(57) ABSTRACT

A method for analyzing and revealing physical links in a mixed wireless and wired network applied in an access device causes the access device to generate an address resolution protocol (ARP) request packet in which a unique identifier in a target hardware address field is inserted. The ARP request packet is broadcast. The access device further receives and determines ARP reply packet transmitted by the one or more client devices. For ARP reply packets which are received from client devices, the access device generates a list of client devices which are linked with the access device.

6 Claims, 3 Drawing Sheets

ACCESS DEVICE FOR ANALYSIS OF PHYSICAL LINKS AND METHOD THEREOF

FIELD

The subject matter herein generally relates to wireless communications.

BACKGROUND

Networks in a mesh arrangement comprise multiple different types of devices including client devices and access devices.

A mesh network can be further divided into multiple virtual area networks. In a layer 2 network for wireless client devices, an access device to which they are physically linked can be established through the WI-FI (IEEE 802.11) protocol. However, for wired client devices, only the local area network in which a wired client device is generally located can be established. Information of which wired client device is currently physically linked to which access device in the local area network cannot be obtained.

Thus, there is room for improvement within the art.

BRIEF DESCRIPTION OF THE DRAWINGS

Implementations of the present technology will now be described, by way of embodiments, with reference to the attached figures, wherein.

DETAILED DESCRIPTION

Figure 1:
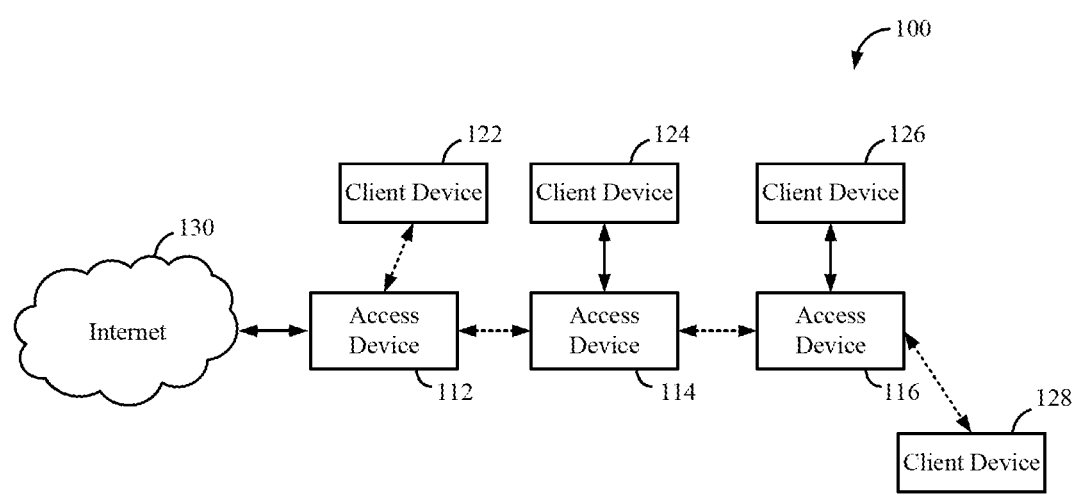
FIG. 1 is a schematic diagram of one embodiment of a network in a mesh arrangement.

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one". The term "comprising", when utilized, means "including, but not necessarily limited to"; it specifically indicates open-ended inclusion or membership in a so-described combination, group, series, and the like.

FIG. 1 illustrates a mesh network 100 according to an embodiment. The mesh network 100 comprises access devices 112-116 and client devices 124-128. The access devices 112-116 are, for example, layer 3 routers, layer 2 routers, wireless access points, and/or extenders. The client devices 124-128 are, for example, set-top boxes, personal computers, mobile phones, printers, and/or other terminal devices. Connections by wire and/or wireless connections may exist between different access devices 112-116 and between different client devices 124-128 and access devices 112-116. It should be understood that the number of such devices shown in FIG. 1 and the manner of linking are only specific embodiments and are not intended to limit the scope of the present disclosure. In general, the number and the manner of linking such devices can be determined by a network administrator of the mesh network 100.

In the embodiment of FIG. 1, each of the access devices 112-116 comprises a wired Ethernet transmission interface and a wireless network transmission interface. The access device 112 can provide gateway services, such as an Internet 130 access service, for the access devices 114 and 116.

Figure 2:
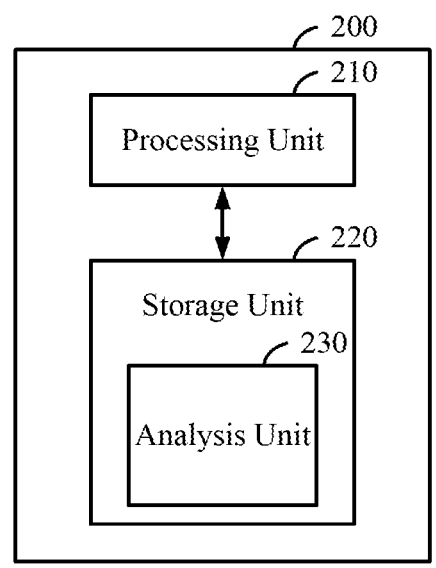
FIG. 2 is a block diagram of one embodiment of an access device in the network.

FIG. 2 illustrates an access device 200 according to an embodiment. The access device 200 comprises a processing unit 210, a storage unit 220, and an analysis unit 230. The processing unit 210 is electrically connected to the storage unit 220. The processing unit 210 can be a microcontroller, microprocessor, or other device having operational processing capabilities configured to execute or process instructions, data, and computer programs stored in the storage unit 220. The storage unit 220 comprises a read only memory (ROM), a random access memory (RAM), a magnetic disk storage medium device, an optical storage medium device, a flash memory device, electrical, optical, or other physical or tangible (e.g., non-volatile) computer readable storage medium for storing one or more computer programs and executed by the processing unit 210. In the embodiment, the storage unit 220 stores or encodes the analysis unit 230 for the processing unit 210 to analyze and reveal physical links.

Figure 3:
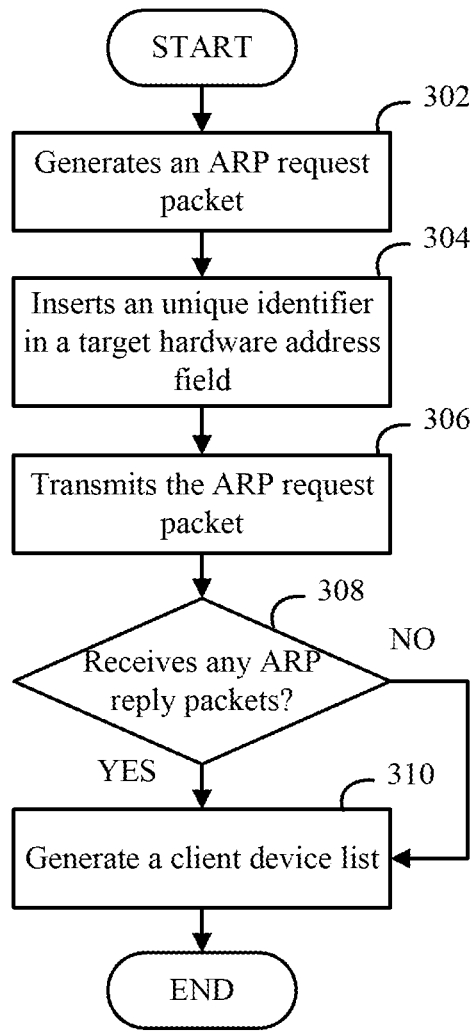
FIG. 3 is a flow chart of one embodiment of a method for operation of the access device in the network.

FIG. 3 illustrates a method for the physical link analysis, executed by the processing unit 210 of the access device 200 according to an embodiment. The operation begins by receiving an instruction to start a physical link analysis.

At block 302, the processing unit 210 generates an address resolution protocol (ARP) request packet.

At block 304, the processing unit 210 inserts a unique identifier (UID) in a target hardware address (THA) field of the ARP request packet. In the embodiment, the access device 200 stores the UID in the storage unit 220 at the time of shipment. The UID cannot be modified, and is unique in a network. In another embodiment, the UID may be an organizational unit identifier (OUID), describing vendor who manufactured the access device 200.

At block 306, the processing unit 210 transmits the ARP request packet.

According to the ARP specification, the ARP request packet is a packet which is broadcast to each device on the same local area network, and each device whether access device or client device will process the ARP request packet. In the embodiment, each client device physically linked to the access device 200 will reply to the ARP request packet.

At block 308, the processing unit 210 determines whether an ARP reply packet is received. In the embodiment, the processing unit 210 configures a specific timer to determine whether an ARP reply packet is received before the set time expires. If no ARP reply packet is received before the set time expires, it is determined that the corresponding access device 200 has not received the ARP reply packet.

If the result at block 308 is "YES", then at block 310, a client device list is further generated according to the received ARP packet and stored in the storage unit 220. In the embodiment, the client device list reveals client devices which are physically linked to the access device 200.

If the result at block 308 is "NO", the physical link analysis is ended.

The access device 200 may also receive an ARP request packet transmitted by another access device 200 in the same local area network. According to an embodiment, when the access device 200 receives the ARP request packet containing the THA field infilled with the UID, it is not directly forwarded through an internal switch, but is transmitted to the processing unit 210 to perform processing. If the processing unit 210 of the access device 200 checks that the ARP request packet carries the UID, the access device 200 will not forward the ARP request packet but will discard it. Thus, none of the client devices linked to the access device 200 will reply to the ARP request packet and the ARP request is restricted to be broadcast within the local area network.

Taking FIG. 1 as an example, when the access device 116 transmits an ARP request packet with UID inserted in the THA field, the client devices 126 and 128 both reply to the ARP request packet. When the access device 114 receives the ARP request packet, it checks that a UID is in the ARP and then discards the packet, so the client device 124 and the access device 112 physically linked to the access device 114 do not reply to the ARP request packet. Finally, the access device 116 generates a list of client devices having a physical link with the access device 116 according to received ARP reply packets, wherein the client device list comprises the client devices 126 and 128.

The ARP request packet and the ARP reply packet used in the above embodiments may also be replaced by other custom or identical protocol packets having the same/similar functions.

A network administrator of the mesh network 100 can effectively determine the physical links of all client devices in the mesh network 100 by using the access devices 112~116 and the physical link analysis method. The method is compatible with existing ARP specification and is applicable to all network devices.

The embodiments shown and described above are only examples. Many other details are often found in such art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An access device, comprising:
a processing unit; and
a storage unit for storing at least one computer program, wherein the computer program comprises instructions which are executed by the processing unit, and performs the following steps:
generating a first address resolution protocol (ARP) request packet;
inserting a unique identifier in a target hardware address field of the first ARP request packet;
transmitting the first ARP request packet;
determining whether an ARP reply packet is received in a predetermined time period; and
recording a device that transmits the ARP reply packet as a client device that is physically linked to the access device in a list of client devices when an ARP reply is received in a predetermined time period;
receiving a second ARP request packet;
determining whether the second ARP request packet carries the unique identifier; and
discarding the second ARP request packet when the second ARP request packet carries the unique identifier.

2. The access device of claim 1, wherein the access device comprises a router, an access point, and an extender for a network in a mesh arrangement.

3. The access device of claim 1, wherein the unique identifier comprises an organizationally unique identifier (OUID).

4. A method for analysis of physical links is applied in an access device, the method comprising:
generating a first address resolution protocol (ARP) request packet;
inserting a unique identifier in a target hardware address field of the first ARP request packet;
transmitting the first ARP request packet;
determining whether an ARP reply packet is received in a predetermined time period; and
recording a device that transmits the ARP reply packet as a client device that is physically linked to the access device in a list of client devices when an ARP reply is received in a predetermined time period;
receiving a second ARP request packet;
determining whether the second ARP request packet carries the unique identifier; and
discarding the second ARP request packet when the second ARP request packet carries the unique identifier.

5. The method of claim 4, wherein the access device comprises a router, an access point, and an extender for a network in a mesh arrangement.

6. The method of claim 4, wherein the unique identifier comprises an organizationally unique identifier (OUID).

* * * * *